United States Patent [19]

Seeger et al.

[11] Patent Number: 5,414,063
[45] Date of Patent: May 9, 1995

[54] PROCESS FOR THE PRODUCTION OF POLYPROPYLENE

[75] Inventors: Horst K. Seeger; Yao-Ching Liu; LeVoy G. Haight; Luis A. Pagan; Kimberly R. Payne; Jeffrey J. Vanderbilt, all of Longview, Tex.

[73] Assignee: Huntsman Polypropylene Corporation, Salt Lake City, Utah

[21] Appl. No.: 40,049

[22] Filed: Mar. 30, 1993

[51] Int. Cl.$^6$ .............................................. C08F 2/34
[52] U.S. Cl. ........................................ 526/88; 526/125; 526/128; 526/351; 526/901
[58] Field of Search ............... 526/88, 125, 128, 901, 526/351

[56] References Cited

U.S. PATENT DOCUMENTS

| | | | |
|---|---|---|---|
| 4,136,243 | 4/1979 | Appleyard et al. | 526/139 |
| 4,329,253 | 6/1982 | Goodall et al. | 252/429 B |
| 4,400,302 | 2/1983 | Goodall et al. | 252/429 B |
| 4,414,132 | 11/1983 | Goodall et al. | 502/169 |
| 4,547,476 | 11/1985 | Terano et al. | 502/127 |
| 4,829,037 | 2/1989 | Terano et al. | 502/112 |
| 4,839,321 | 4/1989 | Murai et al. | 502/127 |
| 4,847,227 | 6/1989 | Murai et al. | 502/127 |
| 4,927,797 | 8/1990 | Ewen | 502/127 |
| 4,970,186 | 11/1990 | Terano et al. | 502/125 |
| 4,983,562 | 1/1991 | Schramm et al. | 502/112 |
| 5,066,737 | 3/1991 | Job | 526/119 |
| 5,077,357 | 2/1991 | Job | 526/119 |
| 5,082,907 | 4/1992 | Job | 526/119 |
| 5,106,806 | 4/1992 | Job | 502/111 |
| 5,122,494 | 6/1992 | Job | 502/125 |
| 5,124,298 | 6/1992 | Job | 502/127 |
| 5,130,284 | 7/1992 | Terano et al. | 502/125 |
| 5,146,028 | 9/1992 | Job | 385/512 |
| 5,147,839 | 9/1992 | Fujita et al. | 502/119 |
| 5,192,732 | 3/1993 | Duranel et al. | 502/126 |
| 5,227,438 | 7/1993 | Rebhar | 526/82 |

OTHER PUBLICATIONS

Derwent Abstract, 1 554 340, pp. 2–13. (Oct. 1979).
"Fiber Reinforced Rubber Modified Polypropylene", W. M. Speri & G. R. Patrick, Polymer Engineering and Science, Sep. 1975, vol. 15, No. 9, pp. 668–672.
"Polypropylene/ethylene-co-propylene blends: influence of molecular structure & composition of EPR on melt rheology, morphology and impact properties of injection-moulded samples", L. D'Orazio, C. Mancarella, E. Martuscelli and F. Polato, POLYMER, 1991, vol. 32, No. 7, pp. 1186–1193.

Primary Examiner—Joseph L. Schofer
Assistant Examiner—David Wu
Attorney, Agent, or Firm—Russell R. Stolle; Ron D. Brown

[57] ABSTRACT

A process control scheme for temporarily slowing or killing the production of polypropylene while idling the reactor using a fourth generation catalyst system containing a solid magnesium chloride supported titanium tetrachloride catalyst component containing an internal strong electron donor in combination with a silicon compound, and an organoaluminum compound (cocatalyst) is disclosed. This process entails the introduction of an amount of an external strong electron donor to the ongoing polymerization reaction. The polymerization reaction can be restarted by introducing an additional amount of the organoaluminum compound.

24 Claims, No Drawings

5,414,063

PROCESS FOR THE PRODUCTION OF POLYPROPYLENE

FIELD OF THE INVENTION

The present invention relates to a process for producing polypropylene using a very high-activity polymerization catalyst under gas-phase fluidized bed reactor conditions. The present invention more particularly relates to a process control scheme that permits the idling of a propylene polymerization reactor that uses a catalyst system containing magnesium chloride supported titanium tetrachloride.

BACKGROUND OF THE INVENTION

A wide variety of propylene, homo and copolymers, both crystalline and amorphous, are commercially produced in gas phase or slurry phase processes. The use of high activity catalyst systems in both processes results in polypropylene resins with low levels of catalyst residue and low levels of amorphous polymer fractions. These low levels of catalyst residue and amorphous polymer fractions eliminate the need for costly extraction and catalyst removal steps. These high activity catalyst systems generally include a Ziegler-Nata type polymerization catalyst that is a magnesium chloride supported titanium tetrachloride; a co-catalyst that is an organoaluminum compound such as triethylaluminum, and an electron donor.

U.S. Pat. Nos. 4,547,476; 4,829,037; 4,839,321; 4,847,227; 4,970,186; 5,066,737; 5,077,357; 5,082,907; 5,106,806; 5,122,494, 5,124,298 and 5,130,284 disclose what is known as fourth generation catalyst systems. These fourth generation catalyst systems typically employ a solid component that is magnesium chloride supported titanium tetrachloride catalyst containing an internal electron donor, in combination with an organo-aluminum co-catalyst, and what is known as a selectivity control agent (SCA) that is a silicon compound such as n-propyltrimethoxy silane, phenyltriethoxy silane, or cyclohexylmethyldimethoxy silane.

The very high-activity of the fourth generation catalyst systems results in very low levels of catalyst residue. However, it has been discovered that the very high-activity of these fourth generation catalysts systems causes problems in gas-phase fluidized bed reactor processes in that the fourth-generation catalyst systems are hard to control or kill. When the reactor needs to be idled for maintenance, something must be done to stop the polymerization process prior to stopping the flow of material out of the reactor or the reactor will fill with solid chunks of polypropylene. Catalyst poisons such as carbon monoxide or carbon dioxide could be introduced into the gas-phase reactor to kill the fourth generation catalyst system. However, the introduction of catalyst poisons is costly because the poisons must be purged from the reactor before the polymerization can be revived.

It would be very desirable, while performing maintenance or repairs on the reactor unit, to be able to temporarily slow or kill the activity of the fourth generation catalyst system in a process employing gas-phase fluidized bed reactors and to easily revive the reaction once the repairs have been completed.

SUMMARY OF THE INVENTION

The process for the production of polypropylene comprises:
(I) reacting in a reactor under gas-phase fluidized bed reactor conditions about 95 to 100 mole % propylene and up to about 5 mole % of a comonomer, based on total monomer, in the presence of a catalyst system comprising;
(A) a solid catalyst component prepared by
(a) reacting in an organic solvent a suspended magnesium compound with titanium tetrachloride in the presence of an organic acid chloride to form a solid substance, containing an internal strong electron donor formed in situ, wherein said magnesium compound is of the formula $$MgQ_{2-n}X_n$$

wherein each Q is independently selected from an alkoxide, aryloxide, or carboxylate group, X is a halogen and n=0 or 1,
(b) decanting then washing said solid substance with an organic solvent that does not dissolve said solid substance,
(c) contacting said solid substance suspended in an organic solvent, with titanium tetrachloride, and
(d) decanting then washing said solid substance with an organic solvent that does not dissolve said solid substance;
(B) a silicon compound of the general formula;

$$SiR_m(OR')_{4-m}$$

wherein R is selected from an alkyl group, a cyclo-alkyl group, an aryl group and vinyl group, R' is an alkyl group and m is zero or an integer of 1–3, with the proviso that when m is 2 or 3, plural R groups may be identical or different, or that when m is zero, 1, or 2 plural R' groups may be identical or different and/or that when R is an alkyl group, R' may be identical with or different from R; and
(C) an organoaluminum compound of the general formula;

$$R''_n AlX_{3-n}$$

wherein R" is an alkyl group, X is a halogen or hydrogen atom and n is an integer of 1–3, with the proviso that when n is 2 or 3, plural R" groups may be identical or different; and
(II) introducing into the reactor an external strong electron donor selected from the group of strong electron donors consisting of ethers, esters, ketones, phenols, amines, amides, imines, nitriles, phosphines, phosphites, stibines, arsines, phosphoramides and alcoholates.

DETAILED DESCRIPTION

Applicants have unexpectedly discovered a process control scheme that permits idling reactors at any time by temporarily slowing or killing the propylene polymerization in a gas-phase fluidized bed reactor process using a fourth generation catalyst system.

The process according to the present invention of temporarily idling the reactor during the production of polypropylene entails introducing into the reactor, of an ongoing polypropylene polymerization reaction, a sufficient amount of an external strong electron donor to slow down or essentially stop the production of polypropylene. At constant reaction conditions increasing the amount of this external strong electron donor will accelerate the slowing down of the reaction. For a particular size reactor, the amount of this external strong electron donor is preferably at least about 0.025 pounds (11 grams), more preferably about 0.0375 to 0.04 pounds (17 to 18 grams) based on a bed weight of 75 pounds (34 kg) an organoaluminum compound/silicon compound molar ratio of 5, an organoaluminum compound/titanium molar ratio of 100, a polypropylene production rate of 30 pounds (13.6 kg) per hour, and a catalyst activity of about 16,000 g/g of solid catalyst. Under these conditions an amount much below 0.025 pounds (11 g) only slows the reaction, still permitting the production of polypropylene, whereas an amount much above 0.04 pounds (18 g) is not needed and only requires the addition of more organoaluminum compound to restart the reaction.

The amount of the external strong electron donor added to the polymerization reaction depends upon the reactor size, amount of catalyst, the component ratios (particularly organoaluminum compound), and the extent of the inactivation desired. Generally, the external strong electron donor is added until the desired inactivity is reached. This amount, even in the same reactor, varies significantly due to different factors and amounts of catalyst components. The external strong electron donor is added to the reactor until the heat of reaction ($\Delta T$) is essentially zero if complete inactivation is desired. Once $\Delta T$ is zero the addition of the external strong electron donor should stop or the revival of the polymerization is more difficult.

The main benefit of the present inventive process is that the reaction can be temporarily killed and then restarted by the addition of more organoaluminum compound. This is not possible with the addition of the catalyst poisons which must be purged to recommence the reaction. The amount of organoaluminum compound added to the reactor to restart the polymerization is preferably an amount to yield an overall organoaluminum compound/external strong electron donor molar ratio of about 1 to 3, more preferably about 1.5 to 2.5, with a molar ratio of about 2 being most preferred.

The process for temporarily idling the polymerization of polypropylene according to the present invention comprises:

(I) reacting for a time in a reactor under gas-phase fluidized bed reactor conditions about 95 to 100 mole % propylene and up to about 5 mole % o of a comonomer, based on total monomer, in the presence of a catalyst system comprising;

(A) a solid catalyst component prepared by
(a) reacting in an organic solvent a suspended magnesium compound with titanium tetrachloride in the presence of an organic acid chloride to form a solid substance, containing an internal strong electron donor formed in situ, wherein said magnesium compound is of the formula $$MgQ_{2-n}X_n$$

wherein each Q is independently selected from an alkoxide, aryloxide, or carboxylate group, X is a halogen and n=0 or 1,
(b) decanting then washing said solid substance with an organic solvent that does not dissolve said solid substance,
(c) contacting said solid substance suspended in an organic solvent, with titanium tetrachloride, and
(d) decanting then washing said solid substance with an organic solvent that does not dissolve said solid substance;

(B) a silicon compound of the general formula;

$$SiR_m(OR')_{4-m}$$

wherein R is selected from an alkyl group, a cyclo-alkyl group, an aryl group and vinyl group, R' is an alkyl group and m is zero or an integer of 1–3, with the proviso that when m is 2 or 3, plural R groups may be identical or different, or that when m is zero, 1, or 2 plural R' groups may be identical or different and/or that when R is an alkyl group, R' may be identical with or different from R; and (C) an organoaluminum compound of the general formula;

$$R''_nAlX_{3-n}$$

wherein R" is an alkyl group, X is a halogen or hydrogen atom and n is an integer of 1–3, with the proviso that when n is 2 or 3, plural R" groups may be identical or different; and (II) introducing into the reactor an external strong electron donor selected from the group of strong electron donors consisting of ethers, esters, ketones, phenols, amines, amides, imines, nitriles, phosphines, phosphites, stibines, arsines, phosphoramides and alcoholates.

The magnesium compound used in producing the solid catalyst component of (A) is preferably suspended in the organic solvent prior to being reacted in step (a). The suspending of the magnesium compound prior to contacting the organic acid chloride and the titanium tetrachloride ensures a more complete reaction. The amount of magnesium compound suspended in the organic solvent is preferably about 2 to 20 wt. %, more preferably about 5 to 15 wt. % with a wt. % of about 10 being most preferred.

The organic solvent can be any organic solvent that does not dissolve magnesium chloride. Suitable organic solvents include aromatic or aliphatic organic solvents, and aromatic or aliphatic halohydrocarbon solvents, preferably an aromatic solvent or an aromatic halohydrocarbon solvent. Examples of suitable specific solvents include benzene, chlorobenzene, and toluene with toluene being most preferred.

Preferred magnesium compounds within the formula above are selected from the group consisting of alkoxy and arylalkoxy magnesium halides; magnesium dialkoxides; magnesium diaryloxides; magnesium alkoxide carboxylates; magnesium aryloxide carboxylates; and magnesium alkoxide aryloxides. Specific examples of suitable magnesium compounds are isobutoxy magnesium chloride, ethoxy magnesium bromide, phenoxy magnesium iodide, cumyloxy magnesium bromide, naphthenoxy magnesium chloride, magnesium di-isopropoxide, magnesium diethoxide, magnesium dibutoxide, magnesium diphenoxide, magnesium dinaphthenoxide, ethoxy magnesium isobutoxide, magnesium dioctanoate, magnesium dipropionate, ethoxy magnesium phenoxide, napthenoxide magnesium isoamyloxide, ethoxy magnesium octanoate, phenoxy magnesium propionate, and chloromagnesium dodecanoate with magnesium diethoxyide being most preferred due to availability and cost. When the strong electron donor of (a) is prepared from an organic acid chloride precursor during the reaction in (a), as will be discussed hereafter, the magnesium compound should have at least one OR group and is preferably magnesium alkoxide or an alkoxy magnesium halide.

The internal strong electron donor of (a) is preferably an ester and is preferably prepared in situ from the corresponding organic acid chloride. The internal strong electron donor is prepared in situ by reacting the organic acid chloride precursor with a magnesium compound such as a magnesium alkoxide. Preferred organic acid chloride precursors used in preparing the internal strong electron donor of (a) are selected from benzoyl chloride and phthaloyl dichloride that are reacted with diethoxy magnesium to form the most preferred internal strong electron donors of ethyl benzoate, and diethyl phthalate.

The term strong electron donor, when used herein, means the compound is a Lewis Base and has a strong electron donating ability so as to complex strongly with active catalyst sites that accept electrons, such as titanium trichloride.

In the catalyst system prepared and used in the process of the present invention, the internal strong electron donor in the solid catalyst component of (A) is present during the reaction in the form of an organic acid chloride precursor in (a) in an amount of 0.1 to 2 moles per mole of magnesium compound, more preferably about 0.2 to 0.4 moles per mole of magnesium compound.

During the preparation of the solid catalyst component (A) the titanium tetrachloride is preferably present in (a) in an amount of about 2 to 6 moles per moles of magnesium compound, with about 3 to 4 moles per mole of magnesium compound being more preferred. Amounts of much over 6 moles of titanium tetrachloride per mole of magnesium compound (a) is more than an amount needed to be effective in producing magnesium chloride, whereas amounts much less than about 2 moles of titanium tetrachloride per mole of magnesium would require more titanium tetrachloride in step (c) or many repeats of (c).

The solid substance prepared in (a) needs to be removed from the solvent by decanting and then washed to remove unreacted components. The washing is conducted with an organic solvent that does not dissolve the solid substance. Suitable examples of such organic solvents include those in (a) above. This washing step of (b) can be repeated as many times as required to remove a sufficient amount of byproducts, contaminants or unreacted components.

The solid substance that has been prepared, washed and decanted is again suspended in organic solvent and treated at least one more time with titanium tetrachloride. This treatment can be conducted once or several times so long as a sufficient amount of the magnesium compound is converted to magnesium chloride and a sufficient amount of titanium tetrachloride is deposited on the surface of the magnesium chloride in the solid substance. After each treatment with titanium tetrachloride or after the final treatment, the solid substance is again decanted and washed with the organic solvent. Each washing can be conducted as many times as needed to remove unwanted substances but is preferably conducted at least three times. The titanium tetrachloride treating step (c) is preferably repeated at least a second time after the washing step (d) and then washed again.

The titanium tetrachloride in initial or subsequent contacting steps is at a concentration in a hundred milliliters of organic solvent of about 200 to 600 millimoles (mmoles) and in a molar ratio of about 2 to 6 moles per mole of magnesium, more preferably about 400 to 500 mmoles in a molar ratio of about 4 to 5 moles per mole of magnesium compound.

The preparation of the solid catalyst component (A) is preferably conducted under agitation at a temperature of about 80° to 125° C. for about 30 minutes to 8 hours with a temperature of about 100° to 110° C. at a time of about 2 to 3 hours being most preferred. At temperatures much below 80° C. the preparation of the solid catalyst component commences to be relatively slow whereas temperatures much above 125° C. commences to evaporate the solvent at atmospheric pressure. Times much less than 30 minutes are probably not sufficient to complete the reactions whereas times much over 8 hours are not needed.

The catalyst system used in the process of the present invention requires the presence of a silicon compound of the formula described above. Examples of suitable silicon compound groups include alkoxysilanes, alkylalkoxysilanes, phenylalkoxysilanes, phenylalkylalkoxysilanes, cycloalkylalkoxysilanes, cycloalkylalkylalkoxysilanes, cycloalkylphenylalkoxysilanes, and cycloalkylalkylphenylalkoxysilanes. Examples of specific silicon compounds include tetramethoxysilane, tetraethoxysilane, tetrapropoxysilane and tetrabutoxysilane, trimethoxyethylsilane, trimethoxymethylsilane, dimethyldimethoxysilane, triethylmethoxysilane, trimethylmethoxysilane, diethyldiethoxysilane, diisobutyldimethoxysilane, propyltrimethoxysilane, ethyltrimethoxysilane, ethyltrisopropoxysilane, phenyltrimethoxysilane, phenyltriethoxysilane, phenyltripropoxysilane, phenyltriisopropoxysilane, diphenyldimethoxysilane, diphenyldiethoxysilane, triphenylmethoxysilane, cyclohexyltriethoxysilane, cyclohexylmethyldimethoxysilane, dicylopentyldimethoxysilane, tricyclohexylethoxysilane, phenyl(methyl)dimethoxysilane, cyclohexyl(ethyl)phenylmethoxysilane, dicyclohexyldiethoxysilane, vinyltrimethoxysilane, vinyl(dimethyl)methoxysilane, and vinyl(cyclohexyl)methyl methoxysilane with cyclohexylmethyldimethoxysilane and phenyltriethoxysilane being most preferred.

The amount of silicon compound (B) (the SCA) in the catalyst system used in the process of the present invention is an amount to yield an organoaluminum compound to silicon compound molar ratio of about 1 to 200, preferably 3 to 50 with an organoaluminum compound/silicon compound molar ratio of about 5 to 25 being most preferred. Organoaluminum compound/silicon compound molar ratios much below about 1 cause low catalyst activity whereas molar ratios much above 200 produce polypropylene with undesirably high xylene solubles content (Xsc).

The organoaluminum compound (C) is preferably selected from the group consisting of trialkylaluminums, dialkylaluminum halides, and dialkylaluminum hydrides. The preferred organoaluminum compound is selected from the group consisting of trimethylaluminum, triethylaluminum, triisobutylaluminum, and diisobutylaluminum hydride with triethylaluminum (TEAL) being most preferred due to availability and cost.

The organoaluminum compound is preferably present in an amount to yield a molar ratio of organoaluminum compound/titanium of about 25 to 300, preferably about 50 to 150, with an organoaluminum compound titanium molar ratio of about 75 to 125 being most preferred. A molar ratio of organoaluminum compound/titanium much below 25 results in a catalyst system with very poor catalyst activity whereas a molar ratio much above 300 is unnecessary.

The external strong electron donor introduced in step (II) is preferably selected from the group of strong electron donors consisting of esters and amines with esters being most preferred due to availability and cost. Examples of suitable esters and amines include ethylbenzoate, methylbenzoate, p-methoxy ethylbenzoate, p-ethoxy methylbenzoate, p-ethoxy ethylbenzoate, ethyl acrylate, methyl methacrylate, ethyl acetate, dimethyl carbonate, dimethyl oxalate, p-chloroethylbenzoate, p-amino hexylbenzoate, isopropyl naphthanate, n-amyl toluate, ethyl cyclohexanoate, propyl pivalate, N,N,N'N'-tetramethyl ethylene diamine, 1,2,4-trimethyl piperazine, 2,3,4,5-tetraethyl piperidine, dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate. The most preferred external strong electron donor is p-ethoxy ethyl benzoate (PEEB).

The organoaluminum compound introduced, after step (II) in a third step (III), to recommence or increase the polymerization reaction is preferably present in an amount to give an organoaluminum compound/external strong electron donor molar ratio of about 1 to 3, more preferably about 1.5 to 2.5 with an organoaluminum compound/external electron donor molar ratio of about 2 being most preferred. Organoaluminum compound/external strong electron donor molar ratios much below 1 result in very slow revival of the polymerization, whereas molar ratios much above 3 can result in too fast of a recovery of the polypropylene polymerization and result in the production of undesirably high Xsc polypropylene.

The term external strong electron donor, when used herein, means that the strong electron donor is not part of the catalyst system but plays an important role in shutting down the reaction mechanism.

The reactants of the solid catalyst compound (A) in the catalyst system according to the present invention are preferably reacted in amounts to yield about 60 to 85 wt. % magnesium dichloride, about 5 to 15 wt. % titanium tetrachloride, and about 10 to 25 wt. % of an internal strong electron donor, more preferably about 68 to 77 wt. % magnesium dichloride, about 8 to 12 wt. % titanium tetrachloride, and about 15 to 20 wt. % of an internal strong electron donor.

The amount of propylene present in the reactor, based on total gas, can vary from about 50 to 98 mole % but is preferably about 65 to 75 mole % with about 70 mole percent being most preferred. The remaining components of the gas are about 20 to 23 mole % nitrogen, 0.1 to 5 mole % hydrogen, and any remainder being inert gases.

In the process of producing the polypropylene according to the present invention in a reactor the reactor is run under the conditions; of a temperature of 45° to 95° C.; a pressure of about 250 to 700 psi (1,723 to 4,823 kPa); a bed weight of about 35 to 130 pounds (16 to 59 kg); a cycle gas flow of about 15,000 to 25,000 pounds per hour (6,310 to 11,350 kg/hr); a residence time of about 50 to 200 minutes; a propylene concentration of about 50 to 98 mole % based on total gas; a hydrogen/propylene molar ratio of about 0,001 to 0.2; a catalyst feed of about 0.5 to 3 cc/hr when the concentration of solid catalyst (A) in the carrier is about 10 to 50 wt. %; a titanium concentration of about 0.13 to 2.16 wt % based on total catalyst slurry; an organoaluminum compound/silicon compound molar ratio of about 1 to 150, and an organoaluminum compound/titanium molar ratio of about 25 to 300.

In the process of the present invention the resulting polypropylene can be removed and incorporated into standard uses or introducing into a second reactor for the production of ethylene/propylene rubber to form an impact polypropylene.

It should be understood that these process conditions are only preferred for a reactor that has a volume around 100 ft$^3$ (2,830 liters) such as reactors in the volume range of 80 to 150 ft$^3$ (2,264 to 4,245 liters). With reactors of much larger scale, certain process conditions will change, such as bed weight, catalyst feed, cycle gas flow, residence time, propylene concentration, etc and may also require more external strong electron donor to slow down or kill the reaction.

During the polymerization reaction the gas-phase fluidized bed reactor contains about 95 to 100 mole % propylene and up to about 5 mole % of a comonomer, based on total monomer. This translates to a comonomer to propylene molar ratio of about 0 to 0.05. The resulting polypropylene produced according to the present invention contains at least 92 wt. % propylene and has a melt flow rate of about 0.5 to 100 g/10 min and a xylene solubles content of about 1 to 25 wt %. The propylene polymer that is produced in the reaction is selected from polypropylene homopolymers and random copolymers containing up to 8 wt. % of a comonomer, such as ethylene, butene, 4-methylpentene-1, or hexene.

The following examples are presented to illustrate the present invention but are not intended to limit the reasonable scope thereof.

EXAMPLES

General—Gas—Phase Process

A continuous gas-phase reactor was used for the production of polypropylene powder. All gas components were purified to remove known catalyst poisons. A gas composition of propylene at 75 mole percent was maintained. Hydrogen concentration was varied to produce the desired melt flow rate polypropylene. The remainder of the gas composition was made up of nitrogen and minor amounts of inert impurities. The reactor bed temperature was maintained at 67° C. The total pressure was 535 psi (3,686 kPa). The bed was fluidized by maintaining a cycle gas flow of 19,000 pounds/hour (8,620 kg/hr). Catalyst was fed continuously to the reactor. TEAL was continuously fed as a dilute solution (2.0 % TEAL) in isopentane. The molar ratio of TEAL/Ti was maintained between 100–110. The silicon compound (SCA) was continuously fed as a dilute solution (0.5 wt. %) in isopentane. The molar ratio of TEAL/SCA was maintained between 4.5 and 5.5 to prepare the desired product. Polypropylene powder was discharged from the reactor at periodic intervals in order to maintain a fairly constant bed weight of 75 pounds. The powder was deactivated by treatment with steam.

Fourth Generation Catalyst System

The fourth generation solid catalyst component (A) used in the examples was prepared, as described in the body of the specification, by reacting magnesium diethoxide with titanium tetrachloride and a strong internal electron donor precursor, the organic acid chloride, phthaloyl dichloride. This produces a solid catalyst component (A) containing about 70 wt. % $MgCl_2$ and about 10 wt. % $TiCl_4$ with the remainder being the internal strong electron donor ester, diethyl phthalate, prepared in situ. In the unmodified fourth generation catalyst system, component (A) is used in combination with TEAL and CHMDS in the amounts and molar ratios specified in the examples.

Polymer Characterization

The polypropylene was characterized using standard analytical testing methodology. The melt flow rate was determined using ASTM Method D-1238-85. The xylene solubles content (Xsc) was determined by dissolution of the polymer in refluxing xylene, allowing the solution to cool to 25° C. to effect crystallization, filtering the slurry, evaporating the solvent and then weighing the residue.

EXAMPLE 1 (Comparative)

The continuous gas-phase reactor disclosed above was run with an unmodified fourth generation catalyst system containing the solid catalyst component (A) above (containing $MgCl_2$ supported $TiCl_4$ and the internal strong electron donor diethyl phthalate prepared in situ), along with TEAL (C) and CHMDS (B) at a TEAL/CHMDS mole ratio of 5, a TEAL/Ti mole ratio of 100, at a temperature of 67° C. and at a hydrogen/propylene mole ratio of 0.004. Under these conditions polypropylene was produced with a melt flow rate of 2.1 g/10 minutes, a Xsc of 1.5 percent, a residual Ti content of 1.5 ppm at a production rate of 30 pounds/hour and at a catalyst activity of 16,500 g/g of solid catalyst. All other conditions were the same as described in the "General Gas-Phase Process".

CHMDS was fed to the reactor until the temperature of the cycle gas stream that was going into the reactor ($T_{in}$) was hotter than the temperature at the midpoint of the reactor ($T_{cen}$). This condition indicates that the bottom half of the reactor was losing more heat from the sides of the insulated reactor than was being released from the polymerization taking place (from the heat of reaction). However, the reaction continued to make polypropylene, the bed weight increased.

EXAMPLE 2 (Comparative)

This example was conducted to determine if a silicon containing SCA, CHMDS could be used to effectively kill the propylene polymerization. A description of the experiment is given below in Table I. The results in Table I show that it is not possible to kill the polymerization and to idle the reactor by injecting a weak electron donor such as a silicon containing SCA (CHMDS).

TABLE I

| Time | Production Rate (lb/hr) | Total Pounds of C-Donor Fed | Comments (Temp. in °C. and Bed Wt in Lb) |
|---|---|---|---|
| 9:45 | 25 | None | Cut off TEAL and catalyst feed to Reactor 1. |
| 10:05 | Not Measured | 0.026 | CHMDS is turned off. $T_{in}$ = 65.4 $T_{cen}$ = 65 and bed wt = 77.6 |
| 10:15 | Not Measured | 0.026 | CHMDS turned on. $T_{in}$ = 65 and $T_{cen}$ = 65. Reactor discharged 2.7 pounds. |
| 10:25 | 13.6 | 0.045 | $T_{in}$ = 65.2; $T_{cen}$ = 65 and bed wt = 79 |
| 10:40 | 13.6 | 0.045 | $T_{in}$ = 65.2; $T_{cen}$ = 64.9 and bed wt = 82.8 |
| 10:58 | 13.6 | 0.057 | $T_{in}$ = 65.2; $T_{cen}$ = 65 and bed wt = 86.6 |
| 11:13 | 13.6 | 0.070 | CHMDS turned off. $T_{in}$ = 65; $T_{cen}$ = 64.9 and bed wt = 90.3 |
| 11:42 | 13.4 | 0.070 | CHMDS turned on. Bed wt = 96.72 |
| 12:05 | 10.6 | 0.096 | CHMDS turned off. Bed wt = 101 |
| 1:30 | 10.0 | 0.096 | CHMDS turned on. $T_{in}$ = 65.4; $T_{cen}$ = 65 and bed wt = 116 |
| 1:53 | 9.6 | 0.122 | CHMDS turned off. $T_{in}$ = 65.6; $T_{cen}$ = 65.2 and bed wt = 118.6 |
| 2:17 | 8.2 | 0.122 | CHMDS turned on. Bed wt = 123 |
| 2:43 | 7.7 | 0.150 | CHMDS turned off. Bed wt = 126.7 |
| 2:54 | 8.2 | 0.150 | CHMDS turned on. Bed wt = 127.9 |
| 3:20 | 7.4 | 0.189 | CHMDS turned off. Bed wt = 131.4 |
| 3:35 | 7.7 | 0.189 | CHMDS turned on. Bed wt = 133.3 |
| 4:08 | 6.2 | 0.239 | CHMDS turned off. Bed wt = 137.3 |
| 4:15 | 6.2 | 0.239 | Catalyst and TEAL turned back on (end of experiment). $T_{in}$ = 65; $T_{cen}$ = 64.9 and bed wt = 139.6 |

Example 4

The same polymerization of propylene using a fourth generation catalyst under the same condition as in Example 1 was carried out. After adding 0.0375 pounds (17 g) of PEEB to 75 pounds (34 kg) of polymer the reactor stopped making polymer. The reactor was idled for three hours and was then restarted within an hour by adding 0.0441 pounds (20g) of TEAL to 75 pounds (34 kg) of polymer. The ratio of moles of TEAL added to moles of PEEB added was 2. This experiment demonstrated that PEEB can be used to effectively kill the very active fourth generation catalyst. It also demonstrated that the reaction can be revived by addition of TEAL.

We claim:

1. A process for the production of polypropylene comprising:
    (I) reacting in a reactor under gas-phase fluidized bed reactor conditions about 95 to 100 mole % propylene and up to about 5 mole % of a comonomer, based on total monomer, in the presence of a catalyst system comprising;
    (A) a solid catalyst component prepared by
        (a) reacting in an organic solvent a suspended magnesium compound with titanium tetrachloride in the presence of an organic acid chloride to form a solid substance, containing an internal strong electron donor formed in situ, wherein said magnesium compound is of the formula $MgQ_{2-n}X_n$ wherein each Q is independently selected from an alkoxide, aryloxide, or carboxylate group, X is a halogen and n=0 or 1,
(b) decanting then washing said solid substance with an organic solvent that does not dissolve said solid substance,
(c) contacting said solid substance suspended In an organic solvent, with titanium tetrachloride, and
(d) decanting then washing said solid substance with an organic solvent that does not dissolve said solid substance;
(B) cyclohexylmethyldimethoxysilane; and
(C) an organoaluminum compound of the general formula;

$$R''_n AlX_{3-n}$$

wherein R" is an alkyl group, X is a halogen or hydrogen atom and n is an integer of 1–3, with the proviso that when n is 2 or 3, plural R" groups may be identical or different; and
(II) introducing into the reactor an external strong electron donor, p-ethoxy ethyl benzoate.

2. The process according to claim 1 wherein the amount of the external strong electron donor added in step (II) is a sufficient amount to lower the heat of reaction ($\Delta T$) of the polymerization reaction to essentially zero.

3. The process according to claim 1 further comprising step (III), introducing an additional amount of the organoaluminum compound of (C) into the reactor to restart the polymerization reaction.

4. The process according to claim 3 wherein the additional amount of the organoaluminum compound is added in an amount to yield an organoaluminum/external electron donor molar ratio of at least about 1.

5. The process according to claim 1 wherein the gas-phase fluidized bed reactor used in producing the polypropylene is run under the following conditions; a temperature of 45° to 95° C.; a pressure of about 250 to 700 psi (1,723 to 4,823 kPa); bed weight of about 35 to 130 pounds (16 to 59 kg); a cycle gas flow of about 15,000 to 25,000 pounds per hour (6,310 to 11,350 kg/hr); a residence time of about 50 to 200 minutes; a propylene concentration of about 50 to 98 mole % based on total gas; a hydrogen/propylene molar ratio of about 0.001 to 0.2; a catalyst feed of about 0.5 to 3 cc/hr when the concentration of solid catalyst (A) in the carrier is about 10 to 50 wt. %; a titanium concentration of about 0.13 to 2.16 wt % based on total catalyst slurry; an organoaluminum compound/silicon compound molar ratio of about 1 to 150, and an organoaluminum compound/titanium molar ratio of about 25 to 300.

6. The process according to claim 1 wherein said comonomer is ethylene present in an amount up to about 5 mole % based on total monomer thereby producing a random ethylene/propylene copolymer.

7. The process according to claim 1 wherein the amount of propylene present during the reaction is about 100 mole % based on total monomer thereby producing a propylene homopolymer.

8. The process according to claim 1 wherein the amount of propylene present during the reaction is about 50 to 98 mole % of total gas.

9. The process according to claim 1 wherein the reactants of the solid catalyst component (A) have been reacted in amounts to yield about 60 to 85 wt. % of a magnesium chloride, about 5 to 15 wt. % titanium tetrachloride, and about 10 to 25 wt. % of an internal strong electron/donor.

10. The process according to claim 9 wherein the reactants of the solid catalyst component (A) have been reacted in amounts to yield about 68 to 77 wt. % of a magnesium chloride, about 8 to 12 wt. % titanium tetrachloride, and about 15 to 20 wt. % of an internal strong electron/donor.

11. The process according to claim 1 wherein the catalyst system has an organoaluminum compound/silicon compound molar ratio of about 5 to 25 and an organoaluminum compound/titanium molar ratio of about 79 to 125.

12. The process according to claim 1 wherein said internal strong electron donor of (a) is diethylphthalate and said organoaluminum compound of (C) is triethylaluminum.

13. The process according to claim 1 wherein the magnesium compound of said catalyst system is suspended in the organic solvent prior to step (a) and is in the amount of about 5 to 15 wt %.

14. The process according to claim 1 wherein said magnesium compound of said catalyst system is selected from the group consisting of isobutoxy magnesium chloride, ethoxy magnesium bromide, phenoxy magnesium iodide, cumyloxy magnesium bromide, naphthenoxy magnesium chloride, magnesium di-isopropoxide, magnesium diethoxide, magnesium dibutoxide, magnesium diphenoxide, magnesium dinaphthenoxide, ethoxy magnesium isobutoxide, magnesium dioctanoate, magnesium dipropionate, ethoxy magnesium phenoxide, napthenoxide magnesium isoamyloxide, ethoxy magnesium octanoate, phenoxy magnesium propionate, and chloromagnesium dodecanoate.

15. The process according to claim 1 wherein the internal strong electron donor of said catalyst system of (a) is an ester which is formed in situ by reacting an organic acid chloride with magnesium alkoxide.

16. The process according to claim 15 wherein said internal strong electron donor of (a) is selected from the group consisting of ethylbenzoate and diethylphthalate formed in situ by reacting benzoyl chloride or phthaloyl dichloride with diethoxy magnesium.

17. The process according to claim 1 wherein the internal strong electron donor in the solid catalyst component of (A) is present during the reaction in the form of an organic acid chloride precursor in (a) in an amount of 0.2 to 0.4 moles per mole of magnesium compound.

18. The process according to claim 1 wherein the amount of titanium tetrachloride present in (a) is about 3 to 4 moles per mole of magnesium compound.

19. The process according to claim 1 wherein the amount of titanium tetrachloride added to 100 ml of the organic solvent containing the suspended solid substance in (c) is about 400 to 500 mmoles and in a molar ratio of about 4 to 5 moles per mole of magnesium compound.

20. The process according to claim 1 wherein step (c) is repeated after at least one washing step (d).

21. The process according to claim 1 wherein steps (a), (b), (c) and (d) of (A) are conducted under agitation at a temperature of about 100° to 110° C. for about 2 to 3 hours.

22. The process according to claim 1 wherein cyclohexylmethyldimethoxysilane is present in an amount to yield an organoaluminum compound to cyclohexylmethyldimethoxysilane molar ratio of about 1 to 200.

23. The process according to claim 1 wherein said organoaluminum compound of (C) is selected from the group consisting of trimethylaluminum, triethylaluminum, triisobutyl-aluminum, and diisobutylaluminum hydride.

24. The process according to claim 1 wherein said organoaluminum compound is present in an amount to yield a molar ratio of organoaluminum compound/titanium of about 50 to 150.

* * * * *